United States Patent [19]

Okuyama et al.

[11] 4,277,735

[45] Jul. 7, 1981

[54] CONTROL APPARATUS FOR INDUCTION MOTOR

[75] Inventors: Toshiaki Okuyama; Yuzuru Kubota; Hiroshi Nagase, all of Hitachi, Japan

[73] Assignee: Hitachi, Ltd., Tokyo, Japan

[21] Appl. No.: 2,799

[22] Filed: Jan. 11, 1979

[30] Foreign Application Priority Data

Jan. 11, 1978 [JP] Japan .................. 53-112278

[51] Int. Cl.$^3$ .................................... H02P 7/36
[52] U.S. Cl. .................................... 318/766; 318/802
[58] Field of Search .................... 318/748–803, 318/805, 807, 812, 766

[56] References Cited

U.S. PATENT DOCUMENTS

| | | | |
|---|---|---|---|
| 3,851,234 | 11/1974 | Hoffman et al. | 318/800 |
| 3,911,340 | 10/1975 | Plunkett | 318/802 |
| 4,019,105 | 4/1977 | Cornell et al. | 318/803 |
| 4,088,935 | 5/1978 | D'Atre et al. | 318/740 X |
| 4,160,940 | 7/1979 | Wolf | 318/808 X |

Primary Examiner—Gene Z. Rubinson

Attorney, Agent, or Firm—Craig & Antonelli

[57] ABSTRACT

An induction motor has a multi-phase primary winding (stator winding) and a multi-phase secondary winding (rotor winding) which are connected to each other in opposite phase relation. The both windings are fed with variable frequency A.C. current from a common frequency converter. A position sensor for sensing a rotor position is mounted on the induction motor. The position signal of the position sensor is in phase with an air gap flux between the primary winding and the secondary winding. Magnitude of a motor current is controlled in accordance with a torque command signal indicative of an error between a speed command signal and a speed feedback signal and with a voltage command signal for determining a terminal voltage, and a phase difference of the motor current relative to the position signal is controlled in accordance with the torque command signal and the voltage command signal. In this manner, the torque generated can be varied while maintaining amount of air gap flux and hence the terminal voltage constant.

5 Claims, 5 Drawing Figures

CONTROL APPARATUS FOR INDUCTION MOTOR

BACKGROUND OF THE INVENTION

1. Field of the Invention

The present invention relates to a control apparatus for an induction motor having its primary winding and secondary winding connected in opposite phase, and more particularly to a control apparatus for an induction motor capable of being operated with a shunt winding characteristic.

2. Description of the Prior Art

As is well known in the art, the induction motor driven through the frequency converter composed of thyristors is often referred to as the commutatorless motor.

It is also well known that the rotational speed of such commutatorless motor depends on the output frequency of the frequency converter, as can be expressed by the following equation:

$$N = \frac{120 f}{p} \quad (1)$$

where
- N: rotational speed of the induction motor
- f: output frequency of the frequency converter, and
- p: number of poles of the motor.

On the other hand, an upper limit is imposed on the output frequency of the frequency converter. In particular, the upper limit of the output frequency is relatively low in the case of a frequency converter in which commutations of thyristors constituting the converter are effected by utilizing an a.c. source voltage. For example, in a cyclo converter which is supplied with power from an a.c. power source of a commercial frequency to control firing angle of the thyristors for producing a sine wave voltage having a variable frequency, the upper limit of the output frequency is usually less than one third of the a.c. source frequency. The permissible highest speed of the induction motor is restricted by the above equation (1). The motor can not be driven at a high speed exceeding the permissible limit, even when load apparatus requires the high speed.

Attempts to solve the above problem have been already proposed. For example, in the article "Cyclo converter Control of the Doubly Fed Induction Motor" by WILLIS F. LONG published in "*THE INSTITUTE OF ELECTRICAL AND ELECTRONICS ENGINEERS*", VOL. IGA-7, No. 1 (1971), pp. 95-100, there is disclosed an induction motor control system in which the primary and the secondary windings of the motor are connected in series in opposite phase relation relative to each other and excited by a common cyclo converter, thereby to attain a rotational frequency twice as high as the frequency of the exciting current. However, the induction motor exhibits the series winding motor characteristics which are disadvantageous in certain application.

For example, it may be contemplated that the commutatorless motor is to be used for driving a rolling mill for steel materials. In such case, the shunt motor characteristic is required for the driving motor, since the series winding motor characteristic is incompatible with load characteristic.

SUMMARY OF THE INVENTION

It is an object of the present invention to provide a control apparatus for an induction motor capable of connecting a primary winding and a secondary winding in series and opposite phase to attain a shunt winding characteristic.

A feature of the present invention resides in that the primary winding and the secondary winding are connected in opposite phase and a magnitude of a motor current is controlled in accordance with a torque command signal and an air gap flux command signal (a voltage command signal which decides a terminal voltage), and a phase of the motor current relative to the air gap flux is controlled such that the air gap flux becomes equal to the air gap flux command signal in accordance with the torque command signal and the air gap flux command signal.

The above and other objects, features and advantages of the present invention will become more apparent from the following description of the preferred embodiments of the invention.

DESCRIPTION OF THE PREFERRED EMBODIMENTS

Figure 1:
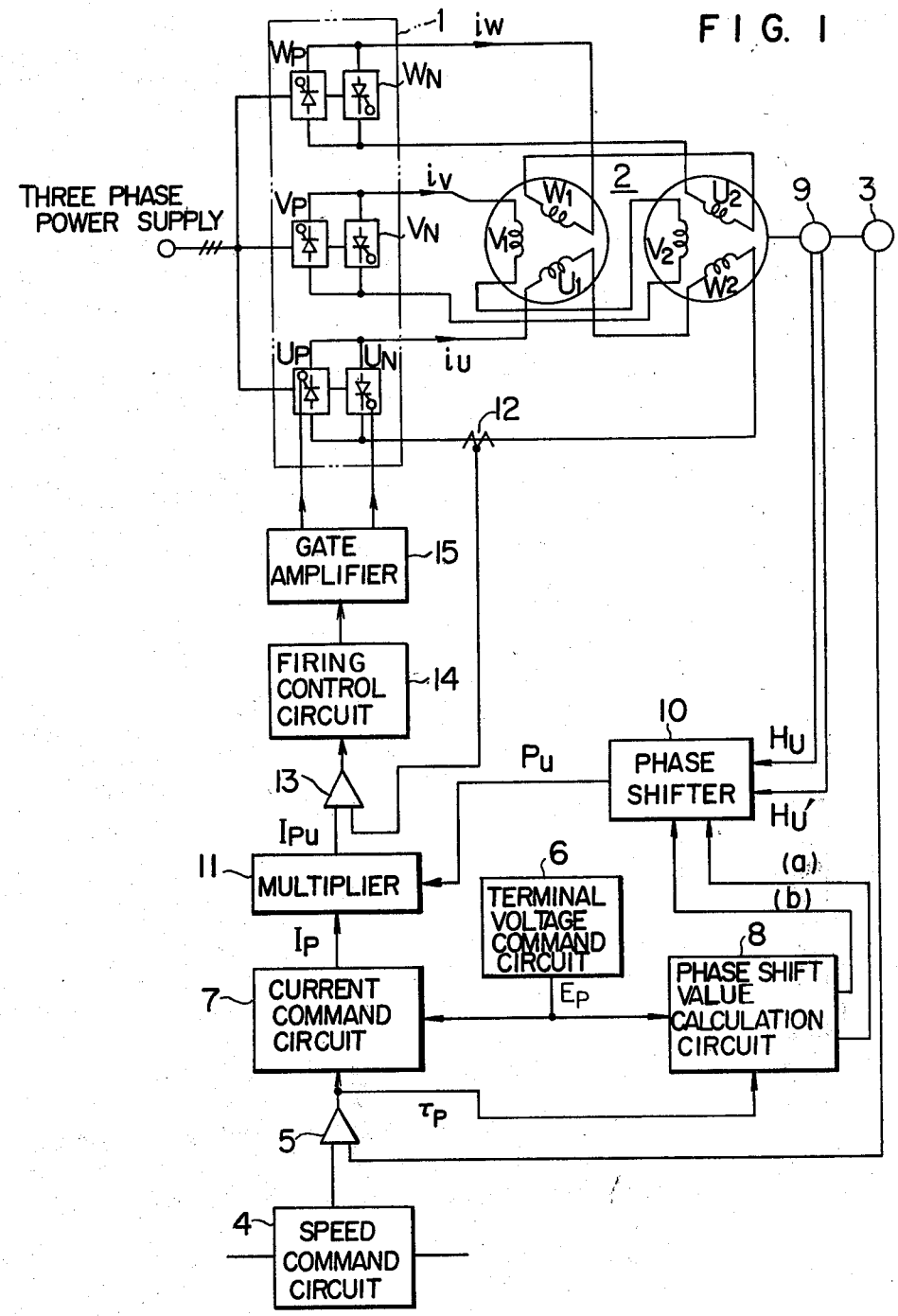
FIG. 1 shows a circuit configuration of one embodiment of the present invention.

FIG. 1 shows a circuit configuration of a control apparatus for an induction motor in accordance with one embodiment of the present invention.

While there are various types of frequency converters, a cyclo converter which produces a sine wave output voltage is used in the illustrated embodiment.

Referring to FIG. 1, reference numeral 1 denotes the cyclo converter (hereinafter referred to also as CYC in an abridged form) which is connected to a commercial a.c. supply source (not shown) to convert a commercial a.c. power into three phase alternating current having a variable frequency. To this end, the cyclo converter 1 comprises three pairs of thyristor bridges $U_P$, $U_N$, $V_P$, $V_N$ and $W_P$, $W_N$ in a Grätz's circuit configuration, with each pair of thyristors connected in anti-parallel to each other. Reference numeral 2 denotes an induction motor having three-phase primary windings $U_1$, $V_1$ and $W_1$ (stator windings) and three-phase secondary windings $U_2$, $V_2$ and $W_2$ (rotor windings). The secondary windings are connected to the primary windings through a slip ring (not shown). Numeral 3 denotes an actual speed signal generator for detecting actual rotation speed of the induction motor 2, while 4 denotes a speed command circuit (reference or desired speed signal generator circuit). The output signals from the speed command circuit 4 and the actual speed signal generator 3 are input to a speed derivation amplifier (or differential amplifier) circuit 5 which is adapted to compare these two speed signals with each other thereby to produce an amplified deviation of the actual speed signal from the reference or desired speed signal. 6 denotes a terminal voltage command circuit for setting a terminal voltage of the motor 2 or an air gap flux, 7 denotes a current command circuit for producing a current command signal $I_p$ in accordance with an output signal (torque command signal) $\tau_p$ from the speed deviation amplifier 5 and a voltage command signal $E_p$ from the terminal voltage command circuit, 8 denotes a phase shift value calculation circuit for calculating phase shift values of the motor current on the basis of the torque command signal $\tau_p$ and the voltage command signal $E_p$ thereby applying the calculated values as phase shift value command signals (a), (b) to a phase shifter 10. 9 denotes a position sensor for producing three-phase sinusoidal wave position signals each having a phase corresponding to a rotational angular position of a rotating shaft of the induction motor. 10 denotes the phase shifter for phase-shifting the positional signal in accordance with the output signal from the phase shift value calculation circuit 8, 11 denotes a current pattern command circuit for multiplying the output signal of the current command circuit 7 by the output signal of the phase shifter 10 to produce a current pattern signal (sine wave signal) for controlling the output current (U-phase) of the CYC 1, 12 denotes a current detector for detecting output currents of the thyristor circuit ($U_P$, $U_N$). The current pattern signal and the output signal from a current detector 12 are compared with each other through a current deviation amplifier 13 which produces an amplified deviation of the signal from the current detector 12 with respect to the current pattern signal. A firing control circuit 14 controls the firing phase or angle for the thyristor circuit ($U_P$, $U_N$) of CYC 1 in dependence upon the output signal from the current deviation amplifier 13. Finally, reference numeral 15 denotes a gate amplifier (a gate signal output circuit) for supplying gate signals to the thyristor circuit ($U_P$, $U_N$) in accordance with the polarity of the output currents of the thyristor circuit ($U_P$, $U_N$). In the drawing, the control circuitry of the above arrangement is again shown only for the thyristor circuit $U_P$, $U_N$ of the U-phase of the cyclo converter 1 for the clarity of the illustration. It will be self-explanatory that substantially the same control circuits (10-15) are provided for the otehr phases (V and W-phases) of the cycloconverter 1. Description of these control circuitries will be unnecessary.

Figure 2:
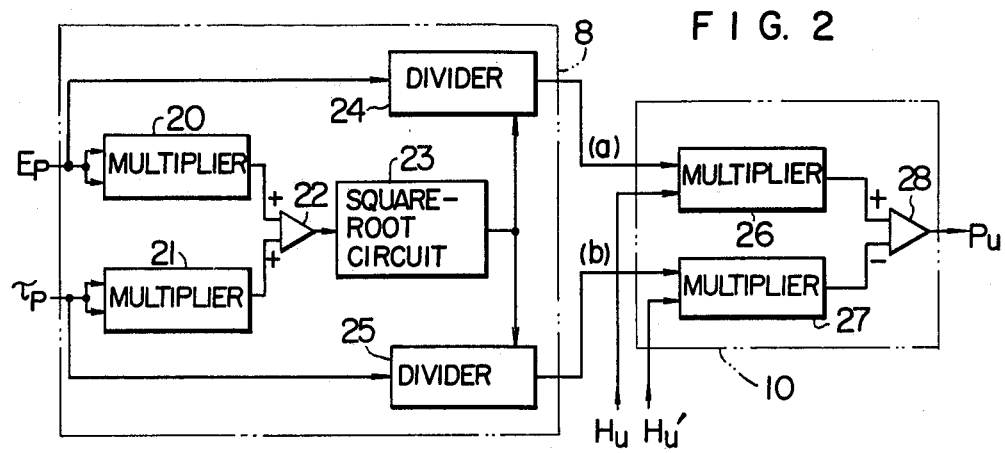
FIG. 2 shows a detailed circuit diagram of a portion of the circuit of FIG. 1.

FIG. 2 shows a detailed circuit diagram of the phase shift value calculation circuit 8 and the phase shifter 10. In FIG. 2, 20 denotes a square circuit for squaring the voltage command signal $E_p$, 21 denotes a square circuit for squaring the torque command signal $\tau_p$, 22 denotes an adder for summing the output signals $E_p^2$ and $\tau_p^2$ of the square circuits 20 and 21, 23 denotes a square-root circuit for calculating a square-root of the output signal of the adder 22 (corresponding to the current command signal $I_p$), and 24 and 25 denote dividers. The components 20 through 25 constitute the phase shift value calculation circuit 8. Numeral 26 denotes a multiplier for multiplying the output signal (a) of the divider by the position signal $H_U$, 27 denotes a multiplier for multiplying the output signal of the divider 25 with the position signal $H_U'$, and 28 denotes an adder an output signal $P_u$ of which provides a phase shifted position signal.

Figure 3:
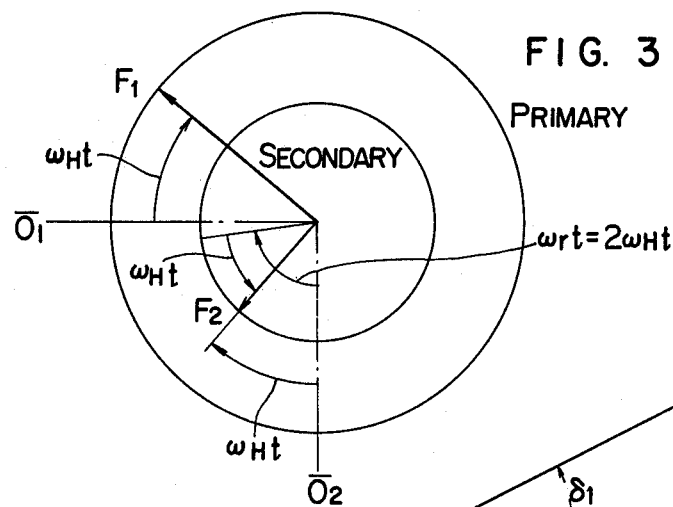
FIG. 3 illustrates opposite phase excitation of an induction motor.

Before explaining the principle of operation of the present invention, the opposite phase excitation is first explained in order to facilitate the understanding of the present invention. FIG. 3 shows a relation between a primary magnetomotive force $F_1$ and a secondary magnetomotive force $F_2$ when 3-phase sinusoidal wave currents in opposite phases to each other are supplied to the primary winding and the secondary winding. Since both the primary and the secondary windings are excited by three-phase alternating current of sine waveform, the magnetomotive forces $F_1$ and $F_2$ will produce circular magnetic fields which are revolved at speeds equal to each other.

It is assumed now that the magnetomotive force $F_1$ is located at $O_1$ with $F_2$ at $O_2$ at the initial time point $t=0$. The rotor (the secondary) will then begin to rotate in the clockwise direction under the influence of torque generated by the electromagnetic force due to $F_1$ and $F_2$. After the time elapse of t seconds, the magnetomotive force $F_1$ has advanced for an electrical angle corresponding to $\omega_H t$ (wherein, $\omega_H$ shows an exciting angular frequency), while the rotor has advanced for an electrical angle of $\omega_r t$ represents a rotational angular frequency, as can be seen from FIG. 3. Because the secondary winding is excited in the opposite phase, $F_2$ has revolved for an electrical angle represented by $(\omega_r t - \omega_H t)$. It is assumed that the angular frequency $\omega_H$ is set to a half ($\frac{1}{2}$) of $\omega_r$. The advance of the magnetomotive force $F_2$ can be given by $$\omega_r t - \omega_H t = \omega_H t \qquad (2)$$

since $\omega_H = \frac{1}{2}\omega_4$.

In this manner, even after elapse of ±seconds, the phase relation between the magnetomotive forces $F_1$ and $F_2$ will remain same as the one prevailing at the starting time point, i.e. when t is equal to zero, with the result that the rotor will continue to rotate under torque produced by the electromagnetic force.

Now, consideration will be made to the relationship between the primary excitation angular frequencies $\omega_H$ of the cyclo converter 1 and the angular velocity of rotation $\omega r/p$ wherein p represents the number of pole pairs. It will be understood that the speed of rotation becomes equal to $2\omega_H/p$. This means that the rotating speed of the induction motor can be increased to twice as high when compared with a hitherto known system, even when the upper limit of the output frequency from the frequency converter or cyclo converter remains same.

In this manner, by exciting in opposite phase, the rotation speed can be doubled. The principle of the present invention is now explained.

Considering voltages $E_1$ and $E_2$ induced in the primary winding and the secondary winding, respectively, when opposite phase excitation is carried out, the following relation between the voltages exists where $2\delta$ is an angle between $F_1$ and $F_2$ as shown in the vector diagram of FIG. 3.

$$E_1 \propto E_2 \propto |F_1| \cos \delta \propto |F_2| \cos \delta \qquad (3)$$

The voltage is proportional to the magnitude of the magnetomotive force and cosine of the angle $\delta$. The voltages in the respective windings connected in series to each other are in phase because the respective windings serve to commonly supply an exciting current for generating the magnetic flux. Accordingly, for a terminal voltage $E_M$ (vector sum of the primary voltage and the secondary voltage) of the motor, the following relation exists similarly.

$$E_M \propto I \cos \delta \qquad (4)$$

where I is the magnitude of the current, which is proportional to the magnetomotive force F.

Assuming that the angle $\delta$ is fixed, the characteristic is such that the voltage $E_M$ changes in proportion to the current I, that is, a series winding characteristic.

On the other hand, the equation (4) shows that when $\cos \delta$ is controlled in inverse proportion to I, $E_M$ is maintained constant irrespective of the change of I.

The present invention attains a shunt winding characteristic based on the above principle.

Turning back to FIG. 1, the operation thereof is now explained. The position sensor 9 produces two sets of 3-phase sine wave position signals $H_U$–$H_W$ and $H_U'$–$H_W'$ having a constant amplitude as shown by the following equations. Pairs of position signals having phase difference of 90°, that is, $H_U$ and $H_U'$, $H_V$ and $H_V'$ and $H_W$ and $H_W'$ are provided so that sine wave signals having desired phases relative to the position signals $H_U$, $H_V$ and $H_W$ are derived by adding the respective paired position signals together.

$$H_U = \cos(\omega_H t + 120°)$$

$$H_V = \cos(\omega_H t)$$

$$H_W = \cos(\omega_H t - 120°)$$
$$H_U' = \sin(\omega_H t + 120°)$$
$$H_V' = \sin \omega_H t$$
$$H_W' = \sin(\omega_H t - 120°) \tag{5}$$

where $\omega_H$ is an angular frequency of the position signal or an excitation angular frequency for the motor. Since the amplitude of the signal is constant, it is not shown. Of the position signals shown in the equations (5), $H_U$ and $H_U'$ are applied to the phase shifter 10 where a phase-shifted positional signal which has been phase-shifted relative to the signal $H_U$ by a predetermined phase is produced while six signals defined by the equations (5) are derived from the position sensor 9, only the signals $H_V$ and $H_V'$ having phase difference of 90° may be derived from the position sensor 9 and the remaining signal may be derived from a well-known addition rule of trigonometical function.

As shown in FIG. 2, the phase shift value calculation circuit 8 produces the following two signals (a) and (b) based on the torque command signal $\tau_p$ and the voltage command signal $E_p$.

$$a = \cos \delta \tag{6}$$

$$b = \sin \delta \tag{7}$$

where $\delta = \tan^{-1}(\tau_p/E_p)$

More particularly, the signals $E_p$ and $\tau_p$ are squared in the square circuits 20 and 21, respectively, and the squared signals are added together in the adder 22. The sum $E_p^2 + \tau_p^2$ is square-rooted in the square-root circuit 23. The resulting square root value represents the current command signal $I_p$ for producing the magnetomotive forces $F_1$ and $F_2$. By dividing the signal $I_p$ or the magnetomotive force $F_1$ (or $F_2$) in the dividers 24 and 25, the signals (a) and (b) defined by the equations (6) and (7) are derived from the dividers 24 and 25, respectively. The signals (a) and (b) are applied to the phase shifter 10 where the position signal $H_U$ is multiplied by the signal (a) in the multiplier 26 and the signal $H_U'$ is multiplied by the signal (b) in the multiplier 27, and the products are added together in the adder 28. As a result, the adder 28 produces the following phase-shifted positional signal $P_U$ based on the addition rule of trigonometrical function.

$$\begin{aligned} P_U &= H_U \cdot a - H_U' \cdot b \\ &= \cos(\omega_H t + 120° + \delta) \end{aligned} \tag{8}$$

The signal $P_U$ corresponds to the position signal $H_U$ defined by the equation (5), which has been phase-shifted by the angle $\delta$.

Similarly, for the remaining V-phase and W-phase, the following phase-shifted position signals $P_V$ and $P_W$ are derived.

$$\begin{aligned} P_V &= H_V \cdot a - H_V' \cdot b \\ &= \cos(\omega_H t + \delta) \end{aligned} \tag{9}$$

$$\begin{aligned} P_W &= H_W \cdot a - H_W' \cdot b \\ &= \cos(\omega_H t - 120° + \delta) \end{aligned} \tag{10}$$

On the other hand, the current command circuit 7 receives the signals $E_p$ and $\tau_p$ and produces the following current command signal $I_p$. The current command circuit 7 is equivalent to the combination of the square circuits 20 and 21, the adder 22 and the square root circuit 23 in the phase shift value calculation circuit 8 shown in FIG. 2.

$$I_p = \sqrt{E_p^2 + \tau_p^2} \tag{11}$$

The phase-shifted signal $P_U$ and the current command signal $I_p$ are multiplied together in the current pattern command circuit 11. As a result, the following current pattern command signal $I_{PU}$ which corresponds to the signal $P_U$ that has been amplitude modulated with the signal $I_p$ is derived from the current pattern command circuit 11.

$$I_{PU} = I_p \cdot P_U \tag{12}$$

Similarly, for the remaining phases, the following current pattern command signals $I_{PV}$ and $I_{PW}$ are derived.

$$I_{PV} = I_p \cdot P_V \tag{13}$$

$$I_{PW} = I_p \cdot P_W \tag{14}$$

Based on the current pattern command signal $I_{PU}$ thus derived, firing of the thyristor circuits $U_P$ and $U_N$ are controlled by the firing control circuit 14. This control is similar to the current control in a well-known static Leonard system and hence it is not explained here. Consequently, the primary current of U-phase is controlled such that it is proportional to the current pattern command signal $I_{PU}$. The remaining phases are similarly controlled and the primary currents $i_{U1}$–$i_{W1}$ in the respective phases are represented by the following equations.

$$i_{U1} = k\, I_{PU}$$
$$i_{V1} = k\, I_{PV}$$
$$i_{W1} = k\, I_{PW} \tag{15}$$

where k is a constant.

Since the primary windings are connected in series with the secondary windings, the currents flow in command through the primary windings and the secondary windings. Accordingly, the secondary currents $i_{U2}$–$i_{W2}$ are represented by the following equations.

$$i_{U2}=i_{W1}$$
$$i_{V2}=i_{V1}$$
$$i_{W2}=i_{U1} \quad (16)$$

As a result of those current flows, the magnetomotive forces $F_1$ and $F_2$ are generated in the following manner. The magnitude thereof is proportional to the current command signal $I_P$ from the relation described above. The angle between the magnetomotive forces $F_1$ and $F_2$ is equal to $2\delta$ because the phase of the position signal has been set to assume a value when $t=0$ in the equation (5) when the directions of the magnetomotive forces of only the V-phase windings of the primary and secondary windings are identical.

As a result, for the terminal voltage $E_M$ of the motor and the generated torque $\tau$, the following relations exist.

$$E_M \propto I_p \cos \delta \quad (17)$$
$$\propto E_p \text{ (constant)}$$

$$\tau \propto I_p \sin \delta \propto \tau_p \quad (18)$$

The relations shown in the equations (17) and (18) are explained with reference to the vector diagram shown in FIG. 3, in which $F_1$ and $F_2$ designate the primary and secondary magnetomotive forces, and $\delta$ designates the angle between the air gap flux $\phi$ and the respective magnetomotive forces.

The air gap flux $\phi$ is generated by the magnetomotive forces $F_1$ and $F_2$ in accordance with the vector sum of those forces. Accordingly, if the angle $\delta$ is controlled in accordance with the load such that $F \cos \alpha$ is maintained constant, the magnitude of the flux $\phi$ will not change. That is, the characteristic is such that the terminal voltage $E_M$ does not change irrespective of the change of the current.

On the other hand, the magnitude of the torque is proportional to the vector product of the air gap flux $\phi$ and the magnetomotive force $F$. That is, when $\phi$ is constant, the torque is proportional to $F \sin \delta$.

As a result that the magnitude of the current (magnetomotive force) and the angle $\delta$ are controlled in accordance with the relations shown by the equations (11) and (7), the terminal voltage $E_M$ is proportional to the command signal $E_p$ and the torque $\tau$ is proportional to the torque command signal $\tau_p$ and the relations shown by the equations (17) and (18) are met. In this manner, the intended object is attained.

As described above, by connecting the primary winding in series with the secondary winding, and increasing the rotation speed during the opposite phase excitation, controlling the magnitude of the current in accordance with the torque command signal and the voltage command signal so that the phase of the current assumes a predetermined phase relative to the air gap flux, the magnitude of the torque can be changed while maintaining the air gap flux or the terminal voltage at the commanded value. In other words, the motor can be operated in the shunt winding characteristic.

While the numbers of turns of the primary winding and the secondary winding are equal to each other and $F_1 = F_2$ in the above embodiment, the same control can be attained in accordance with the present invention even in a case where $F_1 \neq F_2$ ($F_1 > F_2$).

Figure 5:
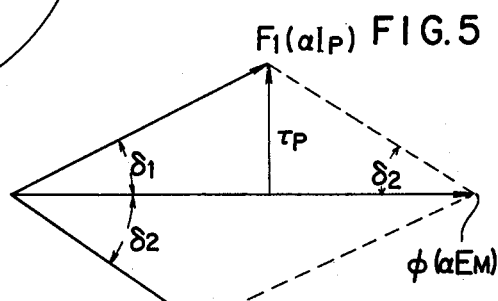
FIG. 5 shows a vector diagram illustrating the operation of another embodiment of the present invention.
Figure 4:
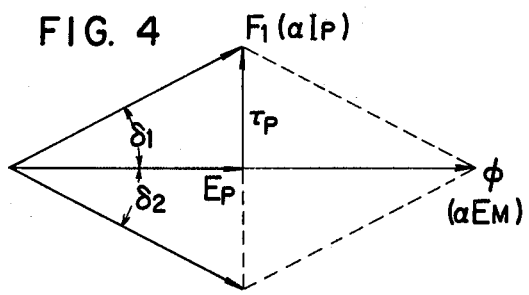
FIG. 4 shows a vector diagram illustrating the operation of the present invention.

In this case, however, the vector diagram takes the form as shown in FIG. 5 in which angles between the magnetomotive forces $F_1$ and $F_2$ and the air gap flux $\phi$ are $\delta_1$ and $\delta_2$ ($\delta_2 > \delta_1$), respectively. Accordingly, the turn ratio should be taken into consideration when the current command signal $I_p$ is to be determined. Furthermore, the phase angles $\delta_1$ and $\delta_2$ must be divided by 2 before they are applied to the phase shifter.

As described hereinabove, according to the present invention, when the primary winding and the secondary winding are connected in series in opposite phase to increase the rotation speed, the motor can be operated in the shunt winding characteristic. Consequently, the motor of the present invention may be adopted for driving a still milling machine.

While it has been described in the above explanation that a complete shunt winding characteristic is attained by the present invention, a compound winding characteristic which is intermediate the series winding and the shunt winding may be attained by a similar control. This can be attained by designing the circuit such that the voltage command signal, which has been fixed in the previous embodiment, is appropriately changed in accordance with the current.

Furthermore, in the present invention, other type of frequency converter than that shown in the embodiment may be used to attain a similar advantage. Furthermore, the number of phases of the motor is not limited to three but any number of phases may be used.

We claim:
1. A control apparatus for an induction motor comprising:
    (a) the induction motor having multi-phase primary and secondary windings connected in opposite phase relation,
    (b) a position sensor for producing a position signal indicative of a rotor position of said induction motor,
    (c) a common frequency converter for supplying a variable frequency A.C. current to the windings of said induction motor,
    (d) a speed control circuit for producing a torque command signal indicative of an error between a speed command signal and a speed feedback signal,
    (e) a current command circuit for producing a current command signal in accordance with magnitudes of said torque command signal and a voltage command signal for determining a terminal voltage of said induction motor,
    (f) phase command means for determining a phase of a motor current relative to an air gap flux in accordance with said torque command signal and said voltage command signal, and
    (g) frequency converter control means for controlling a phase of the output current of said frequency converter in accordance with the output of said phase command means and for controlling a magnitude of the output current of said frequency converter so as to be proportional to said current command signal.

2. A control apparatus for an induction motor according to claim 1 wherein said phase control means phase-shifts said position signal in accordance with said torque command signal and said voltage command signal.

3. A control apparatus for an induction motor according to claim 1 wherein said phase control means includes a phase shift value calculation circuit for calculating amount of phase shift in accordance with said torque command signal and said voltage command signal, and a phase shifter for phase-shifting said position signal in accordance with the output signal of said phase shift value calculation circuit.

4. A control apparatus for an induction motor according to claim 1 further comprising a voltage command circuit for variably adjusting said voltage command signal.

5. A control apparatus for an induction motor comprising:
   (a) the induction motor having multi-phase primary and secondary windings connected in opposite phase relation,
   (b) a position sensor for producing a position signal indicative of a rotor position of said induction motor,
   (c) a common frequency converter for supplying a variable frequency A.C. current to the windings of said induction motor,
   (d) a speed control circuit for producing a torque command signal indicative of an error between a speed command signal and a speed feedback signal,
   (e) a current command circuit for producing a current command signal in accordance with magnitudes of said torque command signal and a voltage command signal for determining a terminal voltage of said induction motor,
   (f) phase command means for determining a phase of a motor current relative to an air gap flux in accordance with said torque command signal and said voltage command signal,
   (g) a current pattern command circuit for producing a current pattern command signal, the phase of which is determined in accordance with the output of said phase command circuit and the magnitude of which is proportional to said current command signal, and
   (h) a current control circuit for controlling the output current of said frequency converter in accordance with said current pattern command signal.

* * * * *

UNITED STATES PATENT AND TRADEMARK OFFICE
CERTIFICATE OF CORRECTION

PATENT NO. : 4,277,735
DATED : July 7, 1981
INVENTOR(S) : T. Okuyama et al

It is certified that error appears in the above—identified patent and that said Letters Patent are hereby corrected as shown below: On The Title Page, Under the heading "Foreign Application Priority Data", "53-112278" should read --53-1122--.

Signed and Sealed this

Second Day of February 1982

[SEAL]

Attest:

GERALD J. MOSSINGHOFF

Attesting Officer

Commissioner of Patents and Trademarks